(12) United States Patent
Oksman et al.

(10) Patent No.: US 7,072,391 B2
(45) Date of Patent: Jul. 4, 2006

(54) ADJUSTMENT OF TRANSMIT POWER BASED ON AN ESTIMATED ELECTRICAL LENGTH OF A LOOP

(75) Inventors: Vladimir Oksman, Morganville, NJ (US); Raphael Rahamim, Orange, CA (US)

(73) Assignee: Broadcom Corporation, Irvine, CA (US)

( * ) Notice: Subject to any disclaimer, the term of this patent is extended or adjusted under 35 U.S.C. 154(b) by 763 days.

(21) Appl. No.: 10/201,129

(22) Filed: Jul. 23, 2002

(65) Prior Publication Data

US 2003/0223482 A1   Dec. 4, 2003

Related U.S. Application Data

(60) Provisional application No. 60/384,469, filed on May 31, 2002.

(51) Int. Cl.
*H04B 1/38* (2006.01)

(52) U.S. Cl. ....................................................... 375/222

(58) Field of Classification Search ........ 375/219–224; 379/26.01, 27.01, 32.04, 399.01
See application file for complete search history.

(56) References Cited

U.S. PATENT DOCUMENTS

| | | | |
|---|---|---|---|
| 6,801,601 | B1 * | 10/2004 | Kamali et al. ............. 379/1.04 |
| 2002/0172329 | A1 * | 11/2002 | Rashid-Farrokhi et al. ...... 379/22.02 |
| 2003/0156685 | A1 * | 8/2003 | Erving et al. ............ 379/27.01 |

* cited by examiner

*Primary Examiner*—Don N. Vo
(74) *Attorney, Agent, or Firm*—Garlick Harrison & Markison LLP; Timothy W. Markison

(57) ABSTRACT

To adjust transmit power of a DSL modem, an estimated electrical length of a loop is first determined when a $1^{st}$ DSL modem at a $1^{st}$ location transmits a plurality of signals to a $2^{nd}$ DSL modem at a $2^{nd}$ location. Each of the signals transmitted by the $1^{st}$ DSL modem have a known frequency and are transmitted at a known power level. Upon receiving the signals, the $2^{nd}$ DSL modem determines the received power level for each of the signals. The $2^{nd}$ DSL modem then estimates an electrical length of a loop between the $1^{st}$ and $2^{nd}$ DSL modems for each of the signals received. The $2^{nd}$ DSL modem then processes a plurality of estimated electrical lengths in accordance with a function to produce a determined electrical length. Having determined the electrical length, the $2^{nd}$ DSL modem adjusts its transmit power accordingly.

32 Claims, 6 Drawing Sheets

DSL system 10

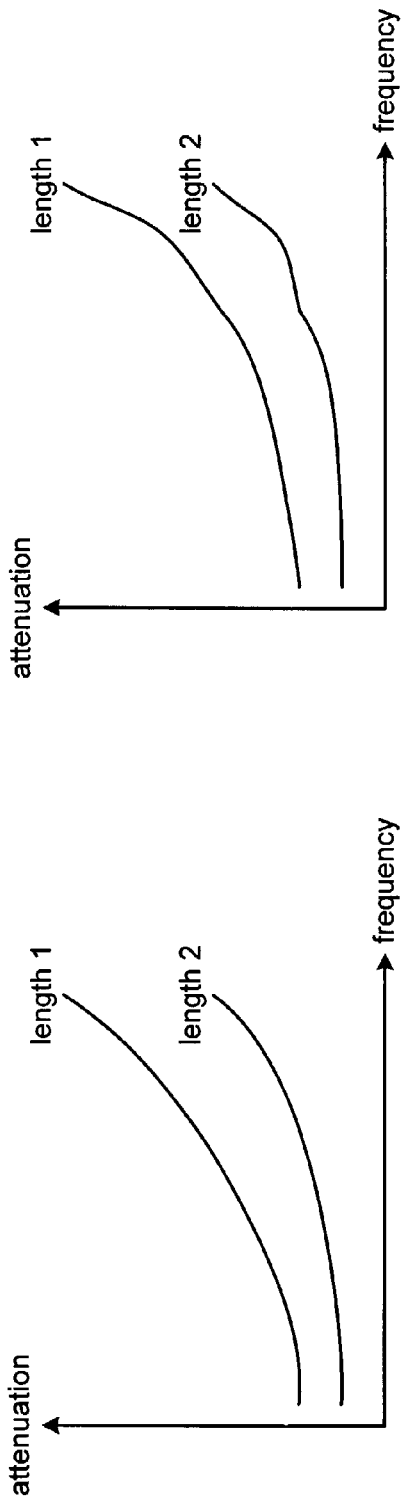
FIG. 3
attenuation of homogeneous loops
FIG. 4
attenuation of non-homogeneous loops
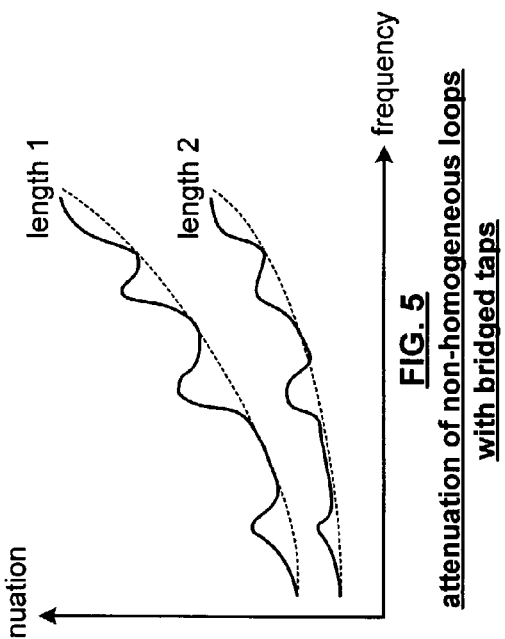
FIG. 5
attenuation of non-homogeneous loops with bridged taps DSL channel frequency spectrum plurality of signals (Tx side)

plurality of signals (Rx side)

plurality of attenuations plurality of estimated electrical lengths

ADJUSTMENT OF TRANSMIT POWER BASED ON AN ESTIMATED ELECTRICAL LENGTH OF A LOOP

This application claims the benefit of provisional application No. 60/384,469 filed May 31, 2002.

BACKGROUND OF THE INVENTION

1. Technical Field of the Invention

This invention relates generally to communication systems and more particularly to Digital Subscriber Line (DSL) based communication systems.

2. Description of Related Art

Communication systems are known to enable a plurality of communication devices to communicate among themselves and with communication devices in other communication systems. Such communication devices, which may be computers, modems, facsimile machines, printers, personal digital assistants, et cetera, communicate voice, text, and/or video data. Such communication systems support the communication of data in accordance with one or more communication standards. As is known, there are a large number of communication standards for the communication of data and vary from country to country, including a plurality of standards governing digital subscriber line (DSL) communications. For example, the United States, Europe, Japan, China and other countries each have standards for various types of DSL based communications, including, but not limited to, asynchronous digital subscriber lines (ADSL) and very high bit rate digital subscriber line (VDSL).

As is also known, for a communication device at a customer premises to participate in a DSL based communication, the communication device includes a DSL modem and communicates with a DSL modem at a central office. The DSL modem at the customer premises is coupled to the DSL modem at the central office via a DSL link (or loop) that typically is comprised of an unshielded pair of wires within a multiple pair cable (i.e., a bundle of pairs of wires).

Due to the usage of multiple pair cables, the length of the DSL loop is limited by mutual interferences between the pairs of wires within the same cable. This interference is generally known as cross-talk, which causes errors in the received signal and thus reduces performance of the DSL modem. Such cross-talk is either near end cross-talk (NEXT) or far end cross-talk (FEXT).

As is known, far end cross-talk of a loop in a multiple pair cable is proportional to the length of a loop and the loop transfer function. As the loop length increases (e.g., greater than 200 meters), the attenuation of the loop, which is an inverted logarithm of the loop transfer function, increases exponentially with respect to the length. At and above such lengths, the attenuation of the loop becomes the dominant factor and attenuates the far end cross-talk.

In a typical access network, DSL links originate at the Central Office (CO) and terminate at the Customer Premises (CPE), which are located at different distances from the Central Office. As such, CPEs coupled to the CO via shorter length loops generate significant far end cross-talk is significant, which, reduces signal-to-noise ratio (SNR) at DSL modems of the central office serving longer length DSL links. The reduced SNR correspondingly reduces upstream (i.e., from the customer premises to the central office) performance of these modems, i.e., forces a lower bit rate, increases error rate, etc.

One known method to reduce far end cross-talk generated by shorter loops is to reduce the transmit power, or power spectral density, for upstream transmissions based on the length and attenuation of the particular loop. To do this, the length of the loop must be determined, which can be done by transmitting a single known signal from the DSL modem at the central office to the DSL modem at the customer premises. The customer premises modem determines the attenuation of the loop based on the power level of the received signal and the known power level the transmitted signal. The customer premises modem then determines the loop length by estimating its electrical loop length obtained by dividing the attenuation of the loop by a reference attenuation value. The reference attenuation value may be obtained by taking the square root of the frequency of the known signal or by some other function relating to the frequency (f) of the known signal; for example: the reference attenuation value may be equal to $\alpha+\sqrt{f}$, or $\alpha+\sqrt{f}+\beta\times f$, where $\alpha$ and $\beta$ are coefficients. Alternatively, multiple signals could be transmitted yielding multiple estimated lengths, which are then averaged to achieve the final estimated electrical length.

In either of these methods for estimating the electrical loop length, errors result in an over estimation of the loop length. Such errors occur because the loop length estimation method does not take into account inaccurate terminations at the end of the wires, mixed wire gauges, bridge taps (unloaded wire drops from the loop for another customer premises) water penetration, improper splicing, et cetera. When the loop length is over estimated, the transmit power is not sufficiently reduced, thus the far end cross-talk is too large and continues to adversely affect the performance of the other DSL modems of the CO in the multi-pair cable.

Therefore, a need exists for a method and apparatus that accurately estimates the electrical loop length and for applications thereof to reduce transmit power of DSL modems.

BRIEF SUMMARY OF THE INVENTION

The adjustment of transmit power based on an estimated electrical length of a loop as disclosed in the present invention substantially meets these needs and others. In one embodiment, a $1^{st}$ DSL modem at a $1^{st}$ location (e.g., a DSL modem within the central office) transmits a plurality of signals to a $2^{nd}$ DSL modem at a $2^{nd}$ location (e.g., a DSL modem at the customer premises). Each of the signals transmitted by the $1^{st}$ DSL modem is of a known frequency and is transmitted at a known power level (e.g., at, above, or below, the nominal transmit power level of the DSL modems within the CO). Upon receiving the signals, the $2^{nd}$ DSL modem determines the received power level for each of the signals. The $2^{nd}$ DSL modem then estimates an electrical length of a loop between the $1^{st}$ and $2^{nd}$ DSL modems for each of the signals received. The estimation is determined by dividing an attenuation factor by a reference attenuation value, where the attenuation factor of the loop is determined based on the known power level of the transmitted signal and the received power level of that signal. The reference attenuation value may be obtained by taking the square root of the frequency of the known signal or by some other function relating to the frequency (f) of the known signal; for example: the reference attenuation value may be equal to $\alpha+\sqrt{f}$, or $\alpha+\sqrt{f}+\beta\times f$, where $\alpha$ and $\beta$ are coefficients.

The $2^{nd}$ DSL modem then processes a plurality of estimated electrical lengths in accordance with a function to produce a determined electrical length. The function corresponds to the characteristics of a loop between the $1^{st}$ and $2^{nd}$ DSL modems (e.g., frequency response, attenuation, gain response, et cetera). In an embodiment of the present invention, the function selects the estimated electrical length having the smallest value as the determined electrical length. Having determined the electrical length, the $2^{nd}$ DSL modem adjusts its transmit power accordingly, which reduces far-end cross talk.

By utilizing the function to determine the electrical length of the loop, a more accurate estimate of the electrical length is obtained. By obtaining a more accurate estimate of the electrical length, the transmit power may be reduced to a more appropriate level, thus reducing the far end cross-talk. By reducing the far end cross-talk, DSL communications occurring within the multi-pair cable that includes this particular DSL loop is improved.

BRIEF DESCRIPTION OF THE SEVERAL VIEWS OF THE DRAWINGS

FIGS. 3–5 are graphical representations of examples of various attenuation responses of DSL loops of the DSL system of FIG. 1;

DETAILED DESCRIPTION OF THE INVENTION

Figure 1:
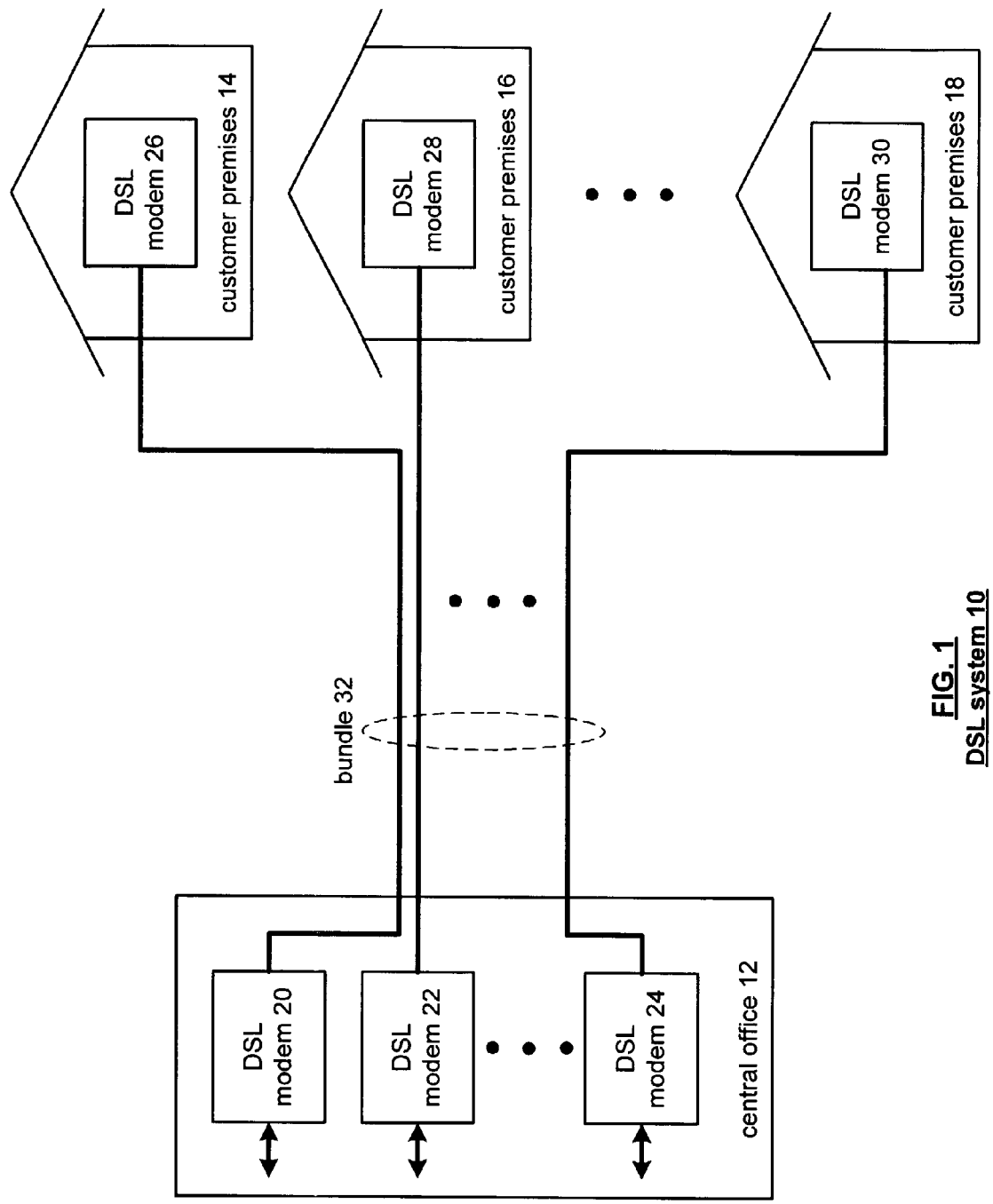
FIG. 1 is a schematic block diagram illustrating a DSL system in accordance with the present invention.

FIG. 1 illustrates a DSL system 10 that includes a central office 12 and a plurality of customer premises 14–18. The central office 12 includes a plurality of DSL modems 20–24. Each of the customer premises includes a DSL modem 26–30. Each DSL modem 26–30 at a customer premises 14–18 is coupled via a twisted pair of wires with a corresponding DSL modem 20–24 in the central office. The twisted pairs between the central office 12 and the plurality of customer premises 14–18 are bundled 32 to produce a multi-pair cable. As is known, a byproduct of the bundling 32 of the twisted wire pairs results in cross-talk interference between the twisted pairs that reduces the performance of the overall DSL system 10.

As one of average skill in the art will appreciate, the DSL system 10 may include multiple central offices and many more customer premises than shown in FIG. 1. For DSL systems that include multiple central offices, the central offices are tied together through a communication system component such as a regional branch exchange.

Figure 2:
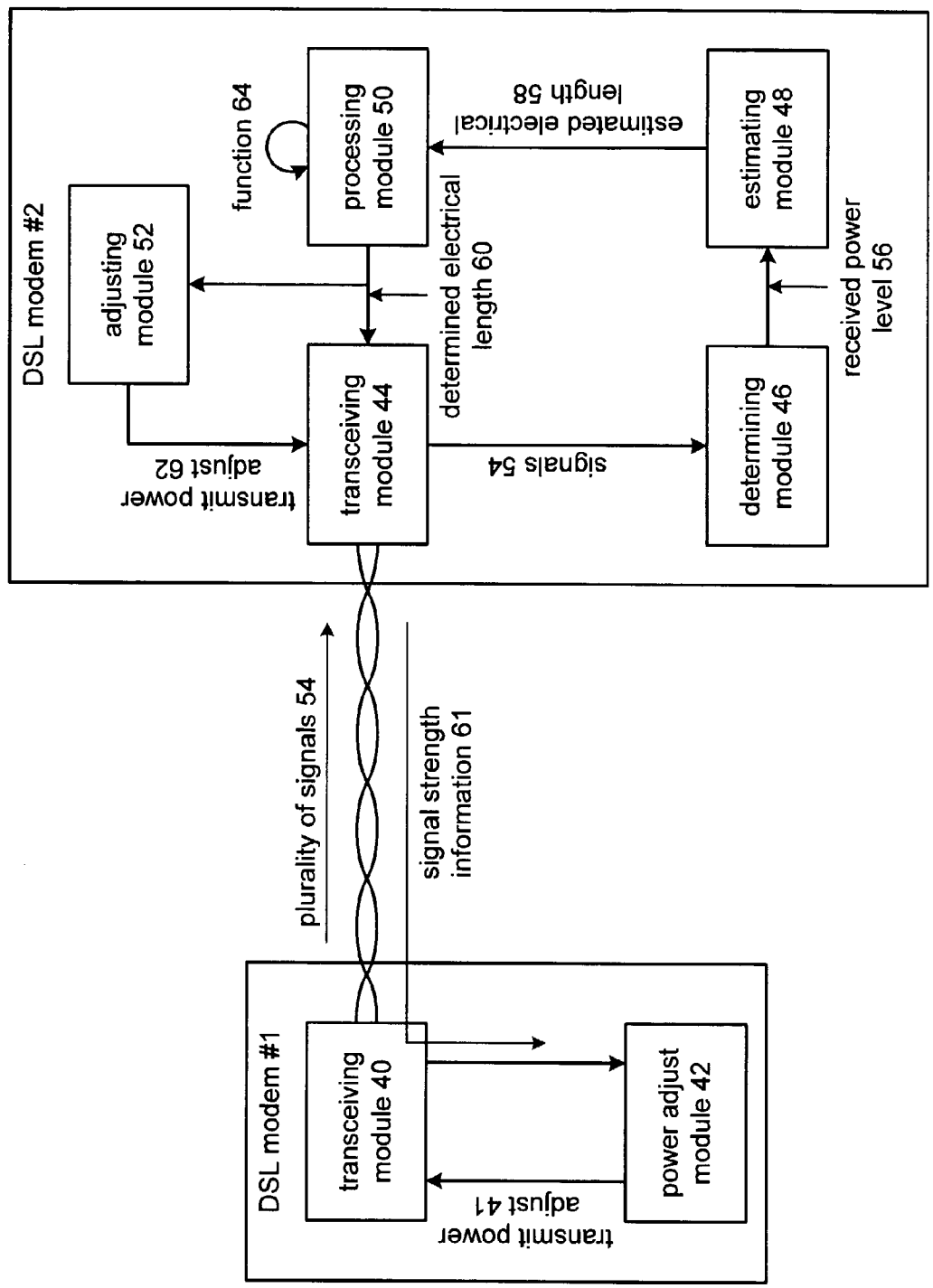
FIG. 2 is a schematic block diagram of two DSL modems communicating in accordance with the present invention.

FIG. 2 illustrates a $1^{st}$ DSL modem communicating to a $2^{nd}$ DSL modem. The $1^{st}$ DSL modem typically corresponds to one of the DSL modems 26–30 within the central office (CO) 12 of FIG. 1 and the $2^{nd}$ DSL modem may correspond to one of the DSL modems 20–24 at the customer premises (CPE) 14–18. While this is the typical configuration, the plurality of signals 54 may be transmitted from the DSL modem at the CPE to a DSL modem within the CO for determining transmit power levels for the DSL modems in the CO and/or the DSL modem at the CPE. The remainder of the discussion will be based on the typical configuration.

As shown, DSL modem #1 includes a transceiving module 40 and an optional power adjust module 42. The $2^{nd}$ DSL module is shown to include a transceiving module 44, a determining module 46, an estimating module 48, a processing module 50 and an adjusting module 52. As one of average skill in the art will appreciate, the transceiver modules 40 and 44 include a transmitter, receiver and a hybrid circuit that converts a 2-wire twisted pair into a 4-wire connection. Accordingly, 2 of the 4 wires are used for the transmitter and the other 2 of the 4 wires are used for the receiver. As such, signals transmitted between the DSL modems are communicated via the transceiving modules 40 and 44.

The transceiving module 40 and the optional adjusting module 42 of the $1^{st}$ DSL modem and the transceiving module 44, determining module 46, estimated module 48, processing module 52 and the adjusting module 52 of the $2^{nd}$ DSL modem may be implemented as a single device in each DSL modem or a plurality of devices. Such a device may be a single processing device or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when a device implements one or more of its functions via a state machine, analog circuitry, digital circuitry, and/or logic circuitry, the corresponding operational instructions are embedded with the circuitry comprising the state machine, analog circuitry, digital circuitry, and/or logic circuitry. In general, the memory stores, and the processing device executes, operational instructions corresponding to at least some of the steps and/or functions illustrated in FIGS. 2–12.

In operation, the $1^{st}$ DSL modem transmits a plurality of signals 54 to the $2^{nd}$ DSL modem. Each of the plurality of signals is of a known frequency and is transmitted at a known power level. The frequency range for the plurality of signals may correspond to a DSL channel frequency spectrum or a portion thereof. As an example for a VDSL system, the plurality of signals 54 may be contained in the down stream bands of a DSL channel and span from a few kilohertz to 12 megahertz with a spacing of 100–500 kilohertz.

The transceiving module 44 provides the plurality of signals 54 to the determining module 46. The determining module 46, which may be a received signal strength indicator, signal-to-noise ratio module, and/or signal-to-interference module, determines the received power level 56 for each of the plurality of signals 54.

The determining module 46 provides the received power level 56 for each of the signals 54 to the estimating module 48. The estimating module 48 estimates an electrical length 58 for each of the signals 54 from the corresponding received power level 56. In one embodiment, the estimating module 48 determines the electrical length 58 of a transmitted signal 54 by determining an attenuation factor based on the known power level of the transmitted signal and the received power level of the transmitted signal and then dividing the attenuation factor by a reference attenuation value. The reference attenuation value may be obtained by taking the square root of the frequency of the known signal or by some other function relating to the frequency (f) of the known signal; for example: the reference attenuation value may be equal to $\alpha + \sqrt{f}$, or $\alpha + \sqrt{f} + \beta \times f$, where $\alpha$ and $\beta$ are coefficients. Once the estimating module 48 has calculated the estimated length for each of the plurality of signals, it provides a plurality of estimated electrical lengths 58 to the processing module 50.

The processing module 50, based on a function 64 that corresponds to the characteristics of the loop between the $1^{st}$ and $2^{nd}$ DSL modems, determines an electrical length 60 from the plurality of estimated lengths 58. The characteristics of the loop may be attenuation, frequency response, gain response, impedance, and/or any other electrical and/or electromagnetic properties of a transmission wire. In one embodiment, the processing module 50, based on the function 64, determines the estimated electrical length 60 from the plurality of estimated electrical lengths 58 as the one having the shortest length. In an alternative embodiment, the processing module 50 provides a weighting factor for each of the estimated electrical lengths 58. The weighting factor is based on to the inverse of the estimated electrical length. As such, estimated electrical lengths that are shorter are given a much greater weighting factor than estimated electrical lengths of greater values. Having weighted each of the estimated electrical lengths, the processing module 50 computes the determined electrical length as an average, root mean square and/or least mean square of the plurality of weighted estimated electrical lengths.

The processing module 50 provides the determined electrical length 60 to the adjusting module 52. Based on the determined electrical length 60, the adjusting module 52 generates a transmit power adjust signal that is provided to the transceiving module 44, which adjusts it transmit power accordingly. The transmit power adjust signal and corresponding the amount of reduction of transmit power may be done in accordance with one or more of the standards governing DSL transmissions. Such standards include, but are not limited to ITU-T, G.993.1, TI-424, and ETSI TS-101-270-2.

If the first DSL modem includes the optional power adjust module 42, processing module 50 provides signal strength information 61 to the transceiving module 44, where the signal strength information 61 may be the plurality of received power levels 56, the plurality of estimated electrical lengths 58, and/or the determined electrical length. The transceiving module 44 transmits the signal strength information 61 to the transceiving module 40 of DSL modem #1. The transceiving module 40 provides the determined signal strength information 61 to the power adjust module 42. Based on the signal strength information 61 from DSL modem #2 and/or from other DSL modems at various other CPEs, the power adjust module 42 generates a transmit power adjust signal 41 that is provided to the transceiving module 40, which adjusts its transmit power in accordance with the transmit power adjust signal. As one of average skill in the art will appreciate, the DSL modems within the CO all use the same nominal transmit power. As such, if the transmit power of the DSL modems within the CO, it will be adjusted based on loop length of multiple DSL modems at the CPEs.

FIG. 3 illustrates a frequency versus attenuation plot of a homogeneous loop (i.e., a loop of the same wire gauge throughout with no bridged taps and proper termination of the ends). The illustration includes 2 loops of various lengths. Length 1 is significantly longer than length 2 and thus has a greater attenuation. For both loops, the attenuation increases nearly exponentially as the frequency increases. When the loop between the $1^{st}$ and $2^{nd}$ DSL modem, as shown in FIG. 2 is known to be a homogeneous loop, as shown in FIG. 3, the number of signals generated by the $1^{st}$ DSL modem may be a relatively small number (1–4) since the loop's performance is predictable as shown in FIG. 3.

FIG. 4 illustrates examples of attenuation versus frequency graph for 2 non-homogeneous loops of different lengths, where a non-homogeneous loop includes improper terminations, different wire gauges, improper splicing, et cetera. As shown, the attenuation increases as the frequency increases in a non-uniform exponential manner. If the loop between the $1^{st}$ and $2^{nd}$ DSL modems of FIG. 2 is known to be a non-homogeneous loop as illustrated in FIG. 4, the entire down stream bands of the DSL channel does not need to be swept (i.e., the plurality of signals does not need to span the entire frequency spectrum of the down stream bands of the DSL channel). However, since the performance of the non-homogeneous loop is not as predictable as the homogeneous loop of FIG. 3, more signals are required to obtain an accurate representation of the electrical length of the loop.

FIG. 5 illustrates a graph of attenuation versus frequency for 2 non-homogeneous loops of various lengths that include bridged taps. As shown, the attenuation dramatically varies from a homogeneous loop. As such, if the loop between the $1^{st}$ and $2^{nd}$ DSL modems of FIG. 2 includes bridged taps as shown in FIG. 5, the entire spectrum of the down stream bands should be swept (i.e., a signal should be generated that corresponds to the entire frequency spectrum of the down stream bands of the DSL channel) to obtain an accurate representation of the loop.

Figure 6:
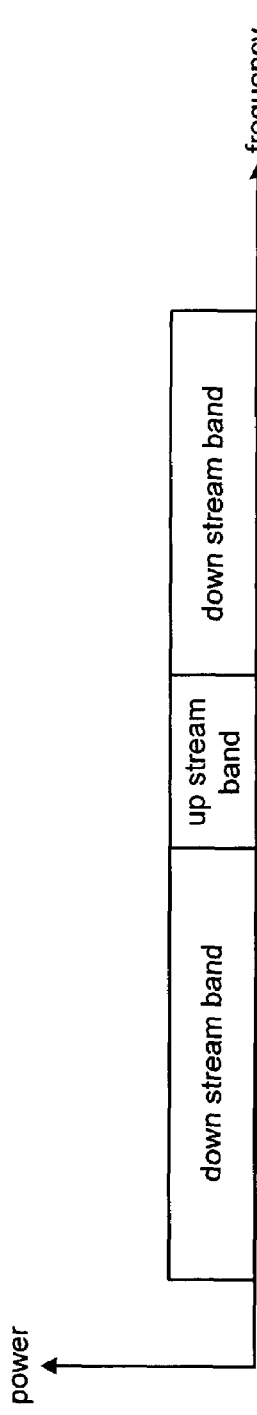
FIG. 6 is a graphical representation of a DSL channel frequency spectrum in accordance with the present invention.

FIG. 6 illustrates a graphical representation of a DSL channel frequency spectrum that includes two down stream frequency bands and one up stream frequency band. In this illustration, the channel spectrum ranges from a low frequency ($f_L$) to a high frequency ($f_H$). The range of frequencies between $f_L$ and $f_H$ is dependent on the particular standard being implemented. For example, for a VDSL, the frequency range may be from a few kilohertz to 12 megahertz.

Figure 7:
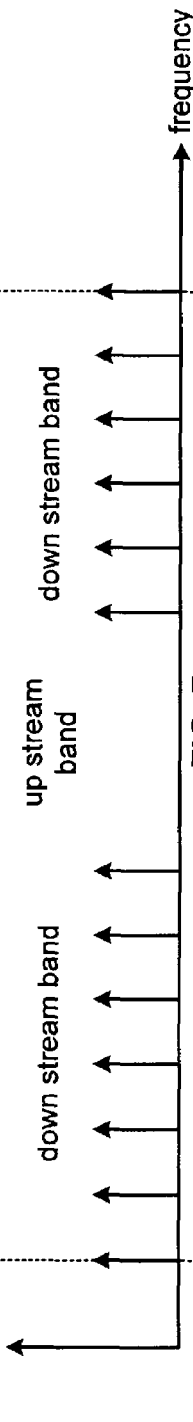
FIG. 7 is a graphical representation of a plurality of signals in accordance with the present invention.

FIG. 7 illustrates a frequency plot of the plurality of signals at the transmit side (e.g., transmitted by DSL modem #1 of FIG. 2) that spans the entire frequency spectrum of the down stream bands of the DSL channel. As mentioned with reference to FIGS. 3 and 4, the plurality of signals is not always required to span the entire channel frequency spectrum of the down stream bands and accordingly may span only a portion of one or both bands. However, if the characteristics of the loop are unknown and/or the loop is known to include bridged taps, the preferred embodiment is to sweep a majority, if not all, of the channel frequency spectrum of the down stream bands illustrated in FIG. 6.

Figure 8:
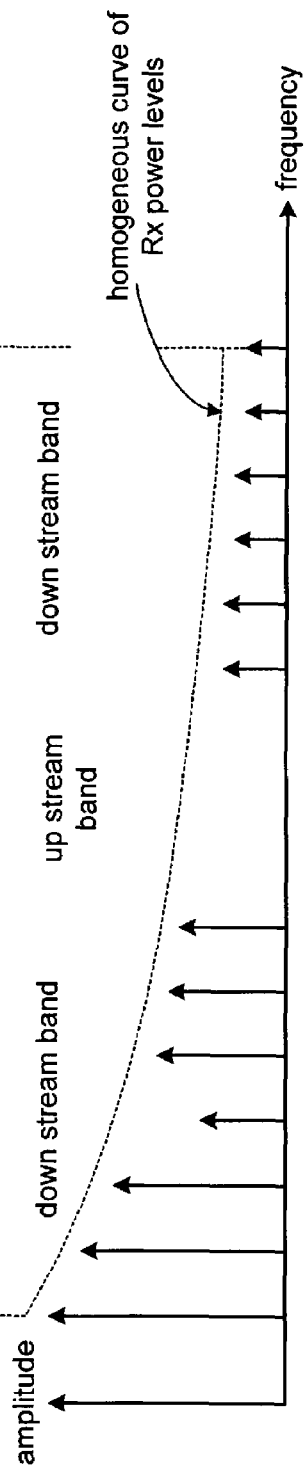
FIG. 8 is a graphical representation of a plurality of received signals in accordance with the present invention.

FIG. 8 illustrates a plot of the signals as received by the $2^{nd}$ DSL modem. As shown, if the loop were a homogeneous loop, each of the corresponding receive signals would have a power level corresponding to the homogeneous curve of the receive power levels. Note that the homogeneous curve is based on the power levels of the signals transmitted in FIG. 7 being of equal value. As one of average skill in the art will appreciate, the signals of FIG. 7 in the higher frequency ranges may have power levels that are different from nominal power levels to compensate for the attenuation of the loop such that the received signal power level is more uniformed.

Figure 9:
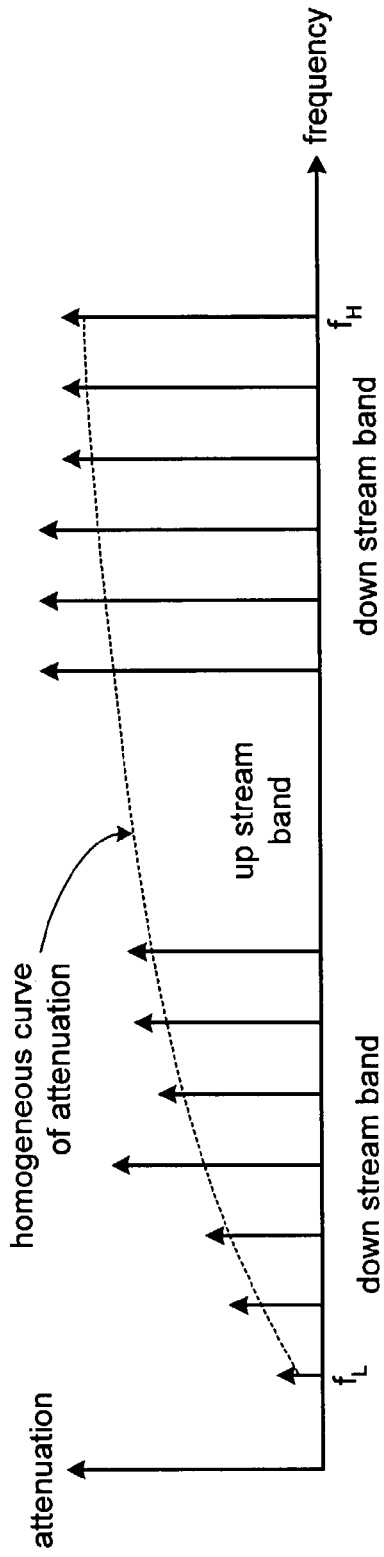
FIG. 9 is a graphical representation of a plurality of attenuations for a DSL loop in accordance with the present invention.

FIG. 9 illustrates a plot of the plurality of attenuations that are generated from the plurality of signals in FIG. 8. As shown, however, several received signals have substantially greater attenuation than the homogeneous curve while others have only slightly greater attenuation than the homogeneous curve. If only one of the these signals were used to estimated the electrical length, as in one prior art method, the electrical length may be dramatically over estimated since the attenuation for a particular signal may be substantially greater than the attenuation of the entire loop.

Figure 10:
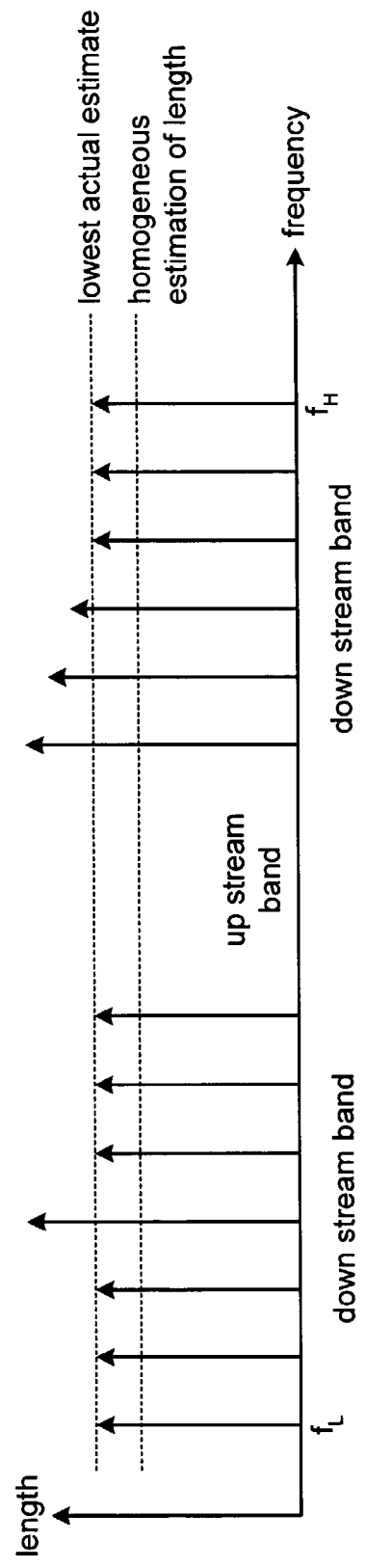
FIG. 10 is a graphical representation of a plurality of estimated electrical lengths of a DSL loop in accordance with the present invention.

FIG. 10 illustrates a plurality of estimated electrical lengths that may be derived from the plurality of attenuations. The estimated electrical lengths may be determined by dividing the attenuation of a corresponding signal in FIG. 9 by a reference attenuation value. The reference attenuation value may be obtained by taking the square root of the frequency of the known signal or by some other function relating to the frequency (f) of the known signal; for example: the reference attenuation value may be equal to $\alpha+\sqrt{f}$, or $\alpha+\sqrt{f}+\beta\times f$, where $\alpha$ and $\beta$ are coefficients. As shown, if the loop were homogeneous, each of the estimated electrical lengths would have about the same value, which corresponds to the homogeneous estimation of length. As shown, the actual estimated electrical lengths for this example have several values just above the homogeneous electrical length and other significantly above the homogeneous loop length. In one embodiment, the lowest actual estimated electrical length may be used as the electrical length for the loop. In an alternate embodiment, the plurality of estimated electrical lengths may be given a weighting factor that is proportional to the inverse of the magnitude of the estimated electrical length. As such, estimated lengths closer to the homogeneous estimation are given much greater weight than those farther away from the homogeneous estimation. In this manner, anomalies within the loop may be more accurately accounted for.

As one of average skill in the art will appreciate, if the properties of the loop are known, only a portion of the plurality of signals needs to be generated. For example, if the loop is known to include bridged taps as shown in FIG. 5, the plurality of signals may be generated to include frequencies that encompass a minimal attenuation value for the loop, i.e., from one peak to the next. Similarly, the plurality of signals may include a smaller number when the loop is known to have the properties illustrated in FIG. 3 or 4.

Figure 11:
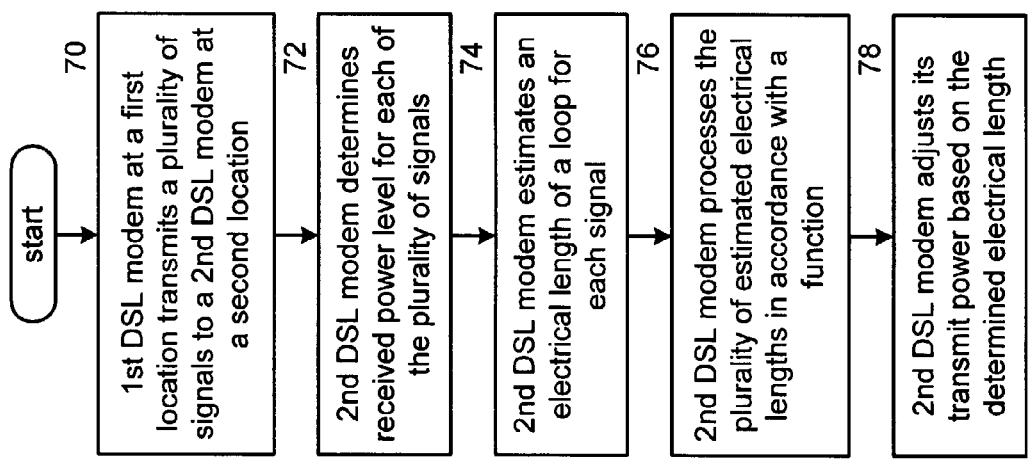
FIG. 11 is a logic diagram of a method for adjusting transmit power based on an estimated electrical length of a loop in accordance with the present invention.

FIG. 11 illustrates a logic diagram of a method for adjusting transmit power of a DSL modem in a DSL system based on an estimated electrical length of a loop. The process begins at Step 70 where a $1^{st}$ DSL modem at a $1^{st}$ location transmits a plurality of signals to a $2^{nd}$ DSL modem at a $2^{nd}$ location. The $1^{st}$ location may be at the central office and the $2^{nd}$ location may be at the customer premises. Typically, the plurality of signals will be transmitted during a training mode for the loop and/or during pilot signaling. Each of the signals transmitted by the $1^{st}$ DSL modem have a known frequency and is transmitted at a known power level. The frequencies of the signals may span the entire frequency spectrum of the down stream bands of a DSL channel, or all channels in the DSL system, or a portion thereof. If the type of loop between the $1^{st}$ and $2^{nd}$ DSL modems is known, the generation of the plurality of signals may be tailored to the particular type of loop.

The process then proceeds to Step 72 where the $2^{nd}$ DSL modem determines received power levels for each of the plurality of signals it receives. This may be done by utilizing a received signal strength indication, signal-to-noise ratio, signal-to-interference ratio, and/or any other means for determining the signal strength of a received signal.

The process then proceeds to Step 74 where the $2^{nd}$ DSL modem estimates an electrical length of the loop for each signal it receives. The estimation may be done by determining an attenuation factor based on the known power level that the signal was transmitted at and the received power level of the signal. The processing continues by dividing the attenuation factor by the reference attenuation value. The reference attenuation value may be obtained by taking the square root of the frequency of the known signal or by some other function relating to the frequency (f) of the known signal; for example: the reference attenuation value may be equal to $\alpha+\sqrt{f}$, or $\alpha+\sqrt{f}+\beta\times f$, where $\alpha$ and $\beta$ are coefficients.

The $2^{nd}$ DSL modem then processes the plurality of estimated electrical lengths in accordance with a function at Step 76. The function corresponds to characteristics of the loop between the $1^{st}$ and $2^{nd}$ DSL modems. The function may be selecting one of the plurality of estimated electrical lengths that has the smallest value. Alternatively, each of the plurality of estimated electrical lengths may be assigned a weighting factor that is non-linear and proportional to the inverse of the magnitude of the estimated length. The processing then would continue by computing the determined electrical length by averaging, producing a root mean square and/or producing a least mean square of the plurality of weighted estimated electrical lengths. The process then proceeds to Step 78 where the $2^{nd}$ DSL modem adjusts its transmit power based on the determined electrical length.

Figure 12:
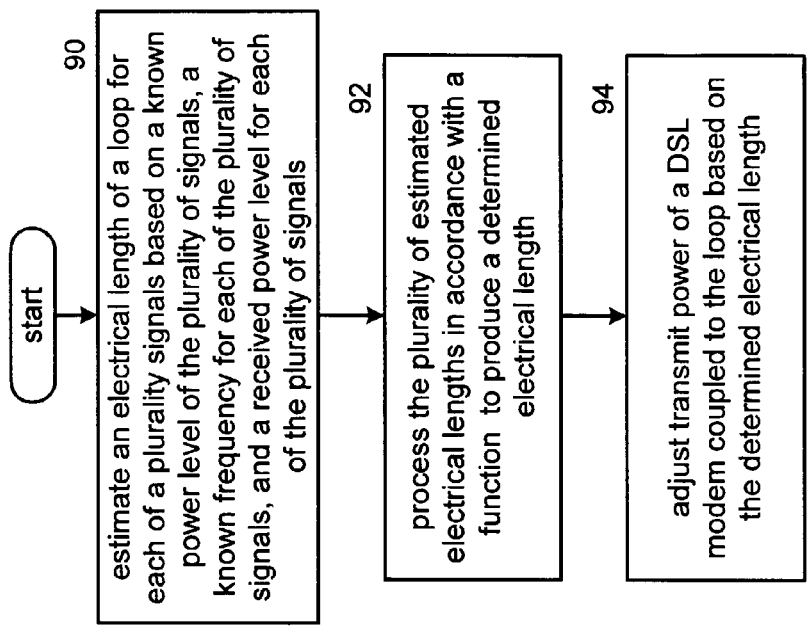
FIG. 12 is a logic diagram of an alternate method for adjusting transmit power based on an estimated electrical length of a loop in accordance with the present invention.

FIG. 12 illustrates an alternate method for adjusting transmit power in a DSL system based on an estimated electrical length of a loop. The process begins at Step 90 where an electrical length of a loop is estimated for each of a plurality of signals based on a known power level of the signals when transmitted, a known frequency for each of the plurality of signals and a received power level for each of the plurality of signals. The process then proceeds to Step 92 where the plurality of estimated electrical lengths are processed in accordance with a function to produce a determined electrical length. The process then proceeds to Step 94 where the transmit power of a DSL modem coupled to the loop is adjusted based on the determined electrical length.

The preceding discussion has presented a method and apparatus for adjusting transmit power of DSL modems in a DSL system based on an estimated electrical length of a loop. By more accurately determining the estimated electrical length, the power adjustment is more accurate thus reducing far end cross-talk. By reducing far end cross-talk in a DSL system, the overall system performs better. As one of average skill in the art will appreciate, other embodiments may be derived from the teaching of the present invention, without deviating from the scope of the claims.

What is claimed is:

1. In a digital subscriber line (DSL) system, a method for adjusting transmit power based on an estimated electrical length of a loop, the method comprises:

transmitting, by a first DSL modem at a first location, a plurality of signals to a second DSL modem at a second location, wherein each signal of the plurality of signals has a known frequency and is transmitted at a known power level;

determining, by the second DSL modem, received power level for each signal of the plurality of signals as the signal is received;

estimating, by the second DSL modem, an electrical length of a loop between the first and second DSL modems for each of the plurality signals received from the first DSL modem to produce a plurality of estimated electrical lengths;

processing, by the second DSL modem, the plurality of estimated electrical lengths in accordance with a function corresponding to characteristics of the loop between the first and second DSL modems to produce a determined electrical length; and adjusting, by the second DSL modem, the transmit power of the second DSL modem based on the determined electrical length.

2. The method of claim 1, wherein the transmitting the plurality of signals further comprises:

producing the plurality of signals to have a frequency range corresponding to a frequency spectrum of at least one down stream band of a DSL channel.

3. The method of claim 1, wherein the transmitting the plurality of signals further comprises:

producing the plurality of signals to have a frequency range corresponding to a portion of a frequency spectrum of at least one down stream band of a DSL channel, wherein the portion of the frequency spectrum corresponds to an attenuation minimum of the loop between the first and second DSL modems.

4. The method of claim 1, wherein the estimating the electrical length for a signal of the plurality of signals further comprises:

determining an attenuation factor based on the known power level and the received power level of the signal; and dividing the attenuation factor by a reference attenuation value to produce a corresponding one of the plurality of estimated electrical lengths, wherein the reference attenuation value is obtained by taking a square root of the frequency of the signal, by taking the square root of the frequency of the signal and adding a first coefficient thereto, or by taking the square root of the frequency of the signal and adding a first coefficient thereto and adding a product of the frequency of the signal and a second coefficient.

5. The method of claim 1, wherein the processing the plurality of estimated electrical lengths in accordance with the function further comprises:

selecting one of the plurality of estimated electrical lengths having a smallest value to produce the determined electrical length.

6. The method of claim 1, wherein the processing the plurality of estimated electrical lengths in accordance with the function further comprises:

establishing a weighting factor for each of the plurality of estimated electrical lengths such that lower valued estimated electrical lengths of the plurality of estimated electrical lengths have a greater weighting factor than higher valued estimated electrical lengths of the plurality of estimated electrical lengths to produce a plurality of weighted estimated electrical lengths; and computing the determined electrical length as at least one of: an average, a root mean square, and a least mean square of the plurality of weighted estimated electrical lengths.

7. The method of claim 1, wherein the transmitting the plurality of signals further comprises:

producing the plurality of signals to have a frequency range corresponding to a frequency spectrum of at least one down stream band of the DSL channel when the characteristics of the loop between the first and second DSL modem are unknown;

producing the plurality of signals to have a frequency range corresponding to a frequency spectrum of at least one down stream band of the DSL channel when the loop between the first and second DSL modems includes a bridged tap; and producing the plurality of signals to have a frequency range corresponding to a portion of a frequency spectrum of at least one down stream band of the DSL channel when the loop between the first and second DSL modems is known to not include a tap, wherein the portion of the frequency spectrum corresponds to an attenuation minimum of the loop between the first and second DSL modems.

8. The method of claim 1 further comprises:

adjusting, by the first DSL modem, the transmit power of the first DSL modem based on the signal strength information to reduce far end cross talk.

9. The method of claim 1 further comprises:

the first location being at a customer premises and the second location being at a central office.

10. A method for estimating electrical length of a loop in a digital subscriber line (DSL) system, the method comprises:

estimating an electrical length of a loop for a signal of a plurality signals based on a known power level of the plurality of signals, a known frequency for the plurality of signals, and a received power level for the plurality of signals and by determining an attenuation factor based on the known power level and the received power level of the signal and dividing the attenuation factor by a reference attenuation value to produce a corresponding one of the plurality of estimated electrical lengths, wherein the reference attenuation value is obtained by taking a square root of the frequency of the signal, by taking the square root of the frequency of the signal and adding a first coefficient thereto, or by taking the square root of the frequency of the signal and adding a first coefficient thereto and adding a product of the frequency of the signal and a second coefficient; and processing the plurality of estimated electrical lengths to produce a determined electrical length.

11. In a digital subscriber line (DSL) system, a method for adjusting transmit power of a DSL modem based on an estimated electrical length of a loop, the method comprises:

estimating an electrical length of a loop for each of a plurality signals based on a known power level of the plurality of signals, a known frequency for each of the plurality of signals, and a received power level for each of the plurality of signals;

processing the plurality of estimated electrical lengths in accordance with a function corresponding to characteristics of the loop to produce a determined electrical length; and adjusting the transmit power of the DSL modem coupled to the loop based on the determined electrical length.

12. The method of claim 11, wherein the estimating the electrical length further comprises:
receiving, by the DSL modem, the plurality of signals, wherein each signal of the plurality of signals is transmitted at the known power level; and
determining, by the DSL modem, the received power level for each signal of the plurality of signals as the signal is received.

13. The method of claim 11, wherein the estimating the electrical length further comprises:
receiving, by the DSL modem, the received power level for each signal of the plurality of signals as the signal is received.

14. The method of claim 11, wherein the estimating the electrical length for a signal of the plurality of signals further comprises:
determining an attenuation factor based on the known power level and the received power level of the signal; and
dividing the attenuation factor by a reference attenuation value to produce a corresponding one of the plurality of estimated electrical lengths, wherein the reference attenuation value is obtained by taking a square root of the frequency of the signal, by taking the square root of the frequency of the signal and adding a first coefficient thereto, or by taking the square root of the frequency of the signal and adding a first coefficient thereto and adding a product of the frequency of the signal and a second coefficient.

15. The method of claim 11, wherein the processing the plurality of estimated electrical lengths in accordance with the function further comprises:
selecting one of the plurality of estimated electrical lengths having a smallest value to produce the determined electrical length.

16. The method of claim 11, wherein the processing the plurality of estimated electrical lengths in accordance with the function further comprises:
establishing a weighting factor for each of the plurality of estimated electrical lengths such that lower valued estimated electrical lengths of the plurality of estimated electrical lengths have a greater weighting factor than higher valued estimated electrical lengths of the plurality of estimated electrical lengths to produce a plurality of weighted estimated electrical lengths; and
computing the determined electrical length as at least one of: an average, a root mean square, and a least mean square of the plurality of weighted estimated electrical lengths.

17. A digital subscriber line (DSL) system comprises:
a first DSL modem at a first location operable to transmit a plurality of signals to a second DSL modem at a second location, wherein each signal of the plurality of signals has a known frequency and is transmitted at a known power level;
the second DSL modem including means for determining received power level for each signal of the plurality of signals as the signal is received;
the second DSL modem including means for estimating an electrical length of a loop between the first and second DSL modems for each of the plurality signals received from the first DSL modem to produce a plurality of estimated electrical lengths;
the second DSL modem including means for processing the plurality of estimated electrical lengths in accordance with a function corresponding to characteristics of the loop between the first and second DSL modems to produce a determined electrical length;
the second DSL modem operable to adjust the transmit power of the second DSL modem based on the determined electrical length.

18. The DSL system of claim 17 further comprises:
the first DSL modem including means for producing the plurality of signals to have a frequency range corresponding to a frequency spectrum of at least one down stream band of a DSL channel.

19. The DSL system of claim 17 further comprises:
the first DSL modem including means for producing the plurality of signals to have a frequency range corresponding to a portion of a frequency spectrum of at least one down stream band of a DSL channel, wherein the portion of the frequency spectrum corresponds to an attenuation minimum of the loop between the first and second DSL modems.

20. The DSL system of claim 17, wherein the means for estimating the electrical length for a signal of the plurality of signals further functions to:
determine an attenuation factor based on the known power level and the received power level of the signal; and
dividing the attenuation factor by a reference attenuation value to produce a corresponding one of the plurality of estimated electrical lengths, wherein the reference attenuation value is obtained by taking a square root of the frequency of the signal, by taking the square root of the frequency of the signal and adding a first coefficient thereto, or by taking the square root of the frequency of the signal and adding a first coefficient thereto and adding a product of the frequency of the signal and a second coefficient.

21. The DSL system of claim 17, wherein the means for processing the plurality of estimated electrical lengths in accordance with the function further functions to:
select one of the plurality of estimated electrical lengths having a smallest value to produce the determined electrical length.

22. The DSL system of claim 17, wherein the means for processing the plurality of estimated electrical lengths in accordance with the function further functions to:
establish a weighting factor for each of the plurality of estimated electrical lengths such that lower valued estimated electrical lengths of the plurality of estimated electrical lengths have a greater weighting factor than higher valued estimated electrical lengths of the plurality of estimated electrical lengths to produce a plurality of weighted estimated electrical lengths; and
compute the determined electrical length as at least one of: an average, a root mean square, and a least mean square of the plurality of weighted estimated electrical lengths.

23. The DSL system of claim 17 further comprises:
the first DSL modem including means for producing the plurality of signals to have a frequency range corresponding to a frequency spectrum of at least down stream channel of a DSL channel when the characteristics of the loop between the first and second DSL modem are unknown;
the first DSL modem including means for producing the plurality of signals to have a frequency range corresponding to a frequency spectrum of at least down stream channel of a DSL channel when the loop between the first and second DSL modems includes a tap; and the first DSL modem including means for producing the plurality of signals to have a frequency range corresponding to a portion of a frequency spectrum at least down stream channel of a DSL channel when the loop between the first and second DSL modems is known to not include a tap, wherein the portion of the frequency spectrum corresponds to an attenuation minimum of the loop between the first and second DSL modems.

24. The DSL system of claim 17 further comprises:
the first DSL modem operable to adjust transmit power of the first DSL modem based on the determined electrical length to reduce far end cross talk.

25. The DSL system of claim 17 further comprises:
the first location being at a customer premises and the second location being at a central office.

26. An apparatus for estimating electrical length of a loop in a digital subscriber line (DSL) system, the apparatus comprises:
means for estimating an electrical length of a loop for each of a plurality signals based on a known power level of the plurality of signals, a known frequency for each of the plurality of signals, and a received power level for each of the plurality of signals; and
means for processing the plurality of estimated electrical lengths to produce a determined electrical length by establishing a weighting factor for each of the plurality of estimated electrical lengths such that lower valued estimated electrical lengths of the plurality of estimated electrical lengths have a greater weighting factor than higher valued estimated electrical lengths of the plurality of estimated electrical lengths to produce a plurality of weighted estimated electrical lengths, and computing the determined electrical length as at least one of: an average, a root mean square, and a least mean square of the plurality of weighted estimated electrical lengths.

27. In a digital subscriber line (DSL) system, an apparatus for adjusting transmit power of a DSL modem based on an estimated electrical length of a loop, the apparatus comprises:
means for estimating an electrical length of a loop for each of a plurality signals based on a known power level of the plurality of signals, a known frequency for each of the plurality of signals, and a received power level for each of the plurality of signals;
means for processing the plurality of estimated electrical lengths in accordance with a function corresponding to characteristics of the loop to produce a determined electrical length; and
means for adjusting transmit power of a DSL modem coupled to the loop based on the determined electrical length.

28. The apparatus of claim 27, wherein the means for estimating the electrical length further functions to:
receive the plurality of signals, wherein each signal of the plurality of signals is transmitted at the known power level; and
determine the received power level for each signal of the plurality of signals as the signal is received.

29. The apparatus of claim 27, wherein the means for estimating the electrical length further functions to:
receive the received power level for each signal of the plurality of signals as the signal is received.

30. The apparatus of claim 27, wherein the means for estimating the electrical length for a signal of the plurality of signals further functions to:
determine an attenuation factor based on the known power level and the received power level of the signal; and
divide the attenuation factor by a reference attenuation value to produce a corresponding one of the plurality of estimated electrical lengths, wherein the reference attenuation value is obtained by taking a square root of the frequency of the signal, by taking the square root of the frequency of the signal and adding a first coefficient thereto, or by taking the square root of the frequency of the signal and adding a first coefficient thereto and adding a product of the frequency of the signal and a second coefficient.

31. The apparatus of claim 27, wherein the means for processing the plurality of estimated electrical lengths in accordance with the function further functions to:
select one of the plurality of estimated electrical lengths having a smallest value to produce the determined electrical length.

32. The apparatus of claim 27, wherein the means for processing the plurality of estimated electrical lengths in accordance with the function further functions to:
establish a weighting factor for each of the plurality of estimated electrical lengths such that lower valued estimated electrical lengths of the plurality of estimated electrical lengths have a greater weighting factor than higher valued estimated electrical lengths of the plurality of estimated electrical lengths to produce a plurality of weighted estimated electrical lengths; and
compute the determined electrical length as at least one of: an average, a root mean square, and a least mean square of the plurality of weighted estimated electrical lengths.

* * * * *